Dec. 14, 1926.  J. SARGENT  1,610,389
SIGNAL DEVICE
Filed Feb. 24, 1925

Inventor
Joseph Sargent

By Watson E. Coleman
Attorney

Patented Dec. 14, 1926.

1,610,389

UNITED STATES PATENT OFFICE.

JOSEPH SARGENT, OF WAUSAU, WISCONSIN.

SIGNAL DEVICE.

Application filed February 24, 1925. Serial No. 11,274.

This invention relates to a signal device and more particularly to a mechanical signaling device adapted to be supported from the rear of a vehicle for the purpose of warning drivers of the presence of the vehicle in advance.

An important object of the invention is to provide a reflecting surface to be supported by a vehicle and to be so supported thereby that it in constant movement, thus rendering it quickly noticeable.

A further object of the invention is to produce a device of this character having its reflecting surface broken so that such reflecting surface is much more readily noticeable than an ordinary continuous surface.

These and other objects I attain by the construction shown in the accompanying drawings, wherein for the purpose of illustration is shown a preferred embodiment of my invention and wherein:—

Figure 1:
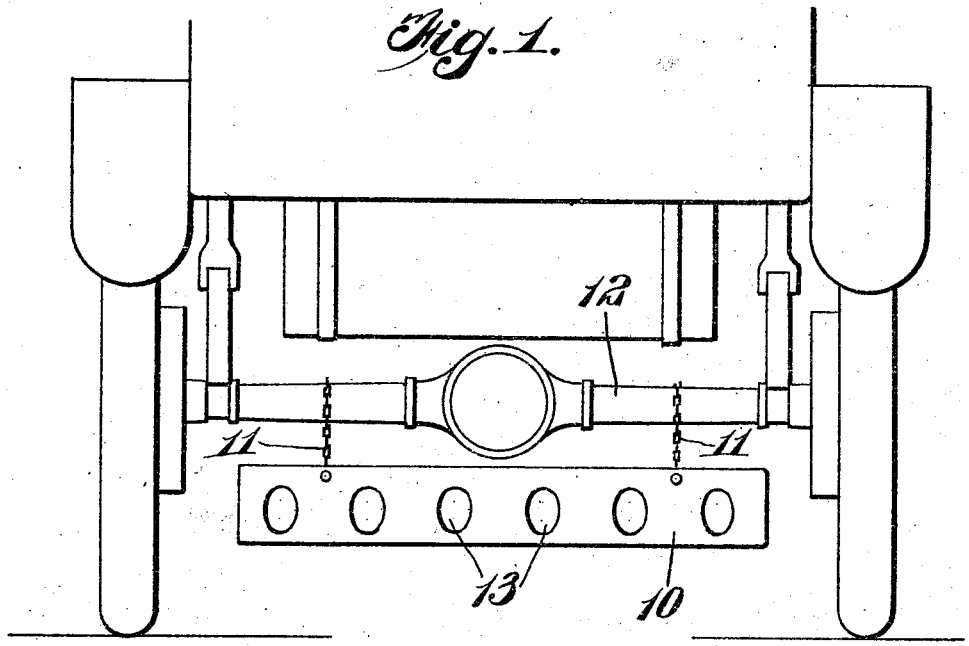
Figure 1 is a rear elevation of an automobile having a signal constructed in accordance with my invention applied thereto.
Figure 2:
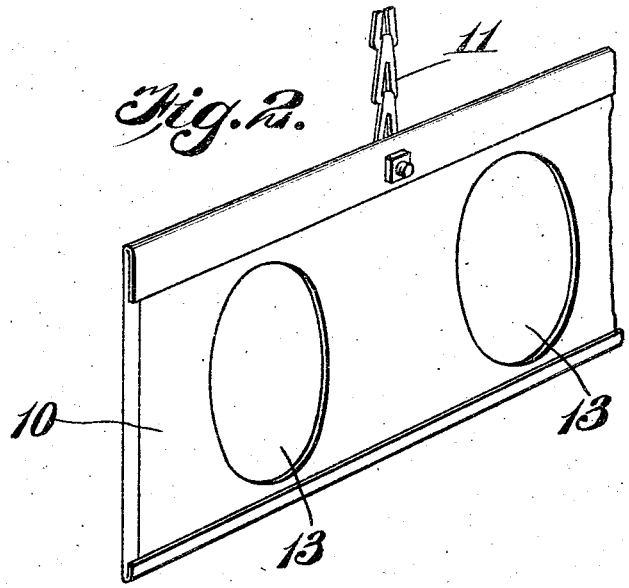
Figure 2 is a fragmentary perspective of the signal viewed from the rear and showing one manner of constructing the same.

Referring now more particularly to the drawings, the signal comprises a plate 10 having at spaced points upon its upper edge flexible connections such as chains 11 which are adapted to be passed about and secured to the rear axle 12 of the vehicle. By this means, the plate may be hung beneath the axle of the vehicle so that it will swing as the vehicle is in movement and will by its movement attract attention. The rear face of this plate is treated so that it will readily reflect light, it being coated with aluminum or white paint or provided with mirror-like surface. The two first mentioned methods of treating the plate are preferred in that they prevent such reflection of light rays directed thereagainst as would tend to dazzle or annoy the drivers of vehicles approaching from the rear.

In order that the plate may be more readily noticeable the reflecting surface thereof is broken as by forming in the plate vertically elongated openings 13 to provide dark spots intermediate the length of the plate and will produce the effect of lighted bars. This combined with the movement of the plate will render the same very noticeable and will prevent rear end collisions between vehicles. Being suspended at a low point, the plate is so positioned as to be very noticeable to the drivers of other vehicles during those times when such notice is particularly necessary as when driving in a fog or on a very dark road where the eyes of the driver of the following vehicle would be directed to the road and not at a point above the road.

Since the structure of the plate is obviously capable of a certain range of change and modification without materially departing from the spirit of my invention, I do not limit myself to such specific structure except as hereinafter claimed.

I claim:—

A signal of the character described, including a substantially rectangular plate, flexible supporting elements secured to one of the longitudinal edges of said plate whereby the same may be suspended from the rear axle of a vehicle, one face of said plate being provided with a reflecting surface, said plate having a plurality of vertical elongated openings arranged in spaced relation throughout the length of the plate dividing the reflecting surface thereof to form a plurality of bars as and for the purpose set forth.

In testimony whereof I hereunto affix my signature.

JOSEPH SARGENT.